May 24, 1966     M. B. GOREN     3,252,920
REJUVENATION OF POISONED ION EXCHANGE RESINS
Filed Oct. 6, 1960
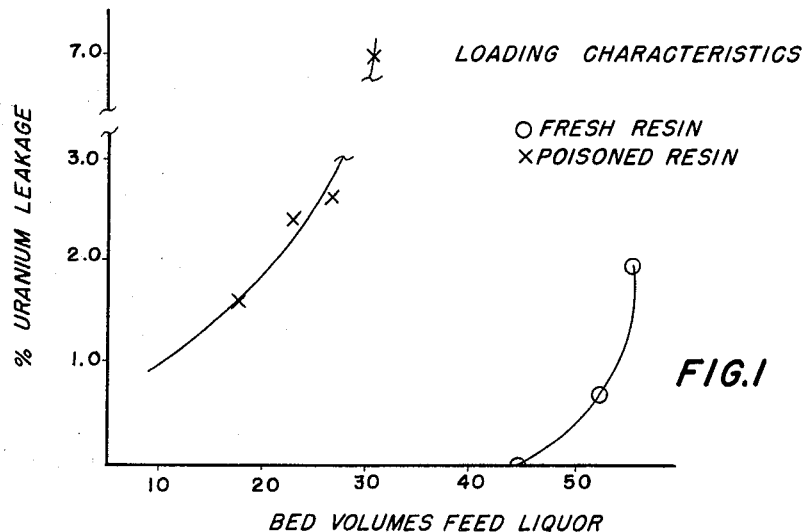
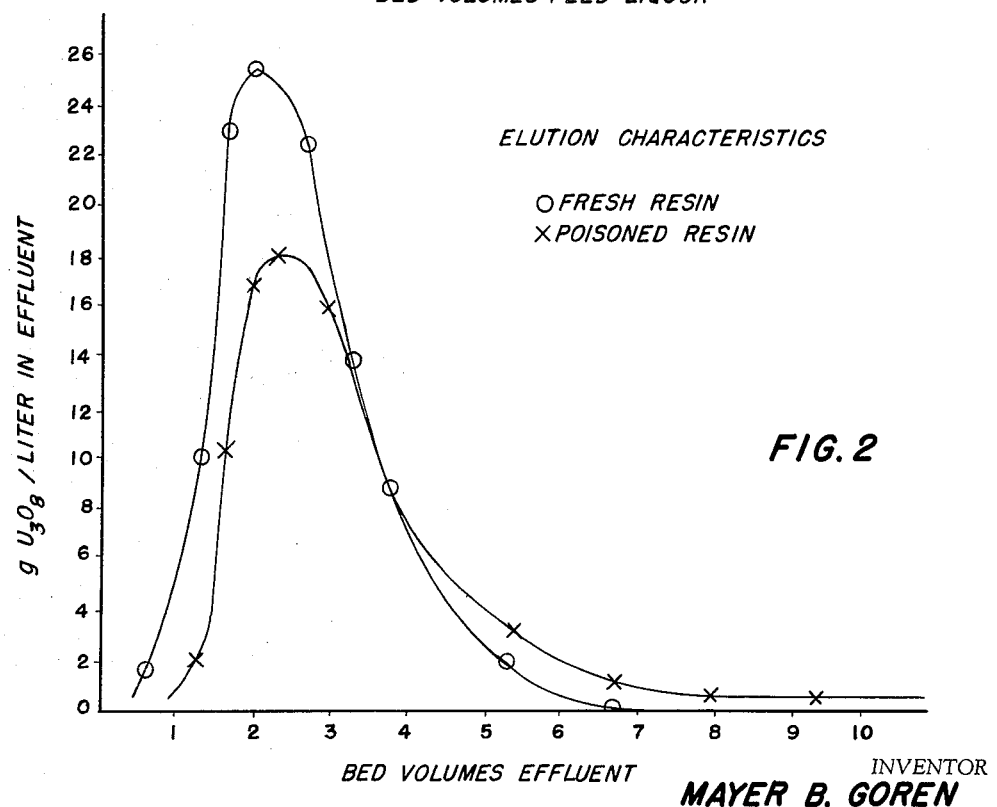
INVENTOR
MAYER B. GOREN
BY
ATTORNEY

United States Patent Office 3,252,920
Patented May 24, 1966

3,252,920
REJUVENATION OF POISONED ION EXCHANGE RESINS
Mayer B. Goren, Golden, Colo., assignor to Kerr-McGee Oil Industries, Inc., a corporation of Delaware
Filed Oct. 6, 1960, Ser. No. 60,816
19 Claims. (Cl. 260—2.1)

This application is a continuation-in-part of my copending application Serial No. 550,250, filed December 1, 1955, now abandoned, for Resin Treatment.

This invention relates to a novel process for the rejuvenation of ion exchange resins and more particularly to the rejuvenation of ion exchange resins of the type which may be employed in hydrometallurgical processes for the selective adsorption and separation of certain metals or metal complexes from solution.

The present invention will be described and illustrated hereinafter with particular reference to those ion exchange resins commonly referred to in the art as being of the strong base (quarternary) type, but it is understood that the process of the invention is not limited thereto and may be also used in rejuvenating other types of ion exchange resins. The preparation of strong base (quarternary) anion exchange resins and their use in hydrometallurgical processes for the selective adsorption and separation of desired substances from pregnant hydrometallurgical leach liquors is well known to those skilled in the art, and the manner of their preparation or use does not comprise a part of this invention. Inasmuch as numerous well known references are available on the foregoing subjects, further more detailed discussion of them is not necessary for an understanding of the present invention.

The presence of low concentrations of various extraneous metal ions, metal complexes, phosphates, silicates, or organic materials in hydrometallurgical leach liquors is known to result in a progressive fouling of active ion exchange sites present on an ion exchange resin. The rate of fouling may be either rapid or relatively slow, depending upon the concentration of the extraneous substances, the degree to which they are adsorbed from the pregnant hydrometallurgical leach liquors in the separation step, and the degree to which they are stripped from the ion exchange sites during the subsequent elution step. With particular reference to the strong base (quartenary) anion exchange resins, the extraneous metal ions, metal complexes, phosphates, silicates, or organic materials apparently may be irreversibly adsorbed by a true ion exchange mechanism on the active quaternary sites of the resin, or these extraneous substances, through hydrolysis or other chemical processes, may be precipitated within the pores of the resin matrix and thus effectively shut off certain portions of the active quaternary sites by decreasing the porosity of the resin. In either or both cases the mass transfer rate of the desired constituents is reduced and also the resin is caused to exhibit a decreased capacity for the desired valuable constituents of the hydrometallurgical leach liquor. Although some of the fouling materials may be removed or stripped in the elution or regeneration step which normally follows the adsorption step, a certain fraction tends to escape stripping and the quantity of undesirable fouling materials apparently irreversibly adsorbed or deposited on the resins increases with succeeding cycles. The build-up of fouling materials will eventually reach a level after a number of cycles at which the efficiency of the ion exchange process begins to suffer markedly, as characterized by persistent or early leakage of the desired valuable constituents in the pregnant hydrometallurgical leach liquor. This is commonly referred to as rapid "breakthrough."

The apparently irreversible adsorption of extraneous fouling materials on the active ion exchange sites may be referred to as "chemical" fouling of the ion exchange resin. The fouling produced by a more or less irreversible precipitation of extraneous fouling materials within the pores of the ion exchange resin matrix and which tends to shut off portions of the ion exchange sites, may be termed "mechanical" fouling. In the case of chemical fouling the number of available active ion exchange sites are greatly reduced, while in the case of mechanical fouling, the resin is rendered less porous and the diffusion of ions through the resin matrix becomes more difficult due to a mechanical blocking action. As a consequence of mechanical fouling, contact time between the ion exchange resin and both the pregnant hydrometallurgical feed liquor and the eluting solution must be prolonged to allow sufficient time for the exchange reaction to reach a true equilibrium for the system. Chemical fouling may greatly reduce the total or "saturation capacity of the ion exchange resin regardless of contact time, while mechanical fouling appears to affect the saturation capacity of the ion exchange resin to lesser degree, but greatly increases the contact time required for the system to reach a true equilibrium. In the instance of aggravated fouling, whether chemical or mechanical, the economic operation of the ion exchange process may become impossible and the ion exchange resin is then said to be "poisoned." The ion exchange resins currently in use are too valuable to discard after relatively short periods of use, and a suitable rejuvenation process must be resorted to for the purpose of restoring the poisoned ion exchange resin to a practical saturation capacity and contact time which will again allow economic operation.

The uranium content of uranium bearing hydrometallurgical leach liquors may be adsorbed as a uranyl sulfate complex by contacting the leach liquor with a strong base (quaternary) anion exchange resin. In this instance, the more common substances contributing to fouling of both chemical and mechanical types include molybdenum, titanium, zirconium, bismuth, silicon (as silicate), phosphorus (as phosphate), hafnium, tungsten, and to lesser extent iron, chromium, lead, tin and manganese. The foregoing substances may be adsorbed on active ion exchange sites either as anions such as titanates, molybdates, and silicates, or as an ionic complex such as the complexes of iron with chloride, fluoride, or phosphates, and thus cause chemical fouling of the ion exchange resin. These metals may also be deposited as slightly soluble precipitates such as phosphates, or through hydrolysis, oxychlorides and hydroxides, and thus cause mechanical fouling of the ion exchange resin.

Furthermore, the exact nature of the fouling by a given species of ion or ion complex may change with the environment of the resin system. For example, silicon may be adsorbed on the ion exchange sites as colloidal or soluble silicic acid or silicate during the adsorption step, and during the regeneration or elution step, the soluble adsorbed silicate may revert to a dehydrated silica which deposits as a precipitate within the resin matrix. It is also believed that molybdenum may be essentially irreversibily adsorbed from acid sulfate solution as a molybdenyl sulfate complex. On the other hand, in the presence of reducing agents and particularly under the influence of light the adsorbed molybdenyl sulfate complex may be largely converted to the complex "molybdenum blue." Thus, poisoning of an ion exchange resin probably has its genesis in many complex reactions which, in general, give rise to a combination of both chemical and mechanical fouling. However, in all instances the poisoned ion exchange resin is characterized by early or persistent break-through of the desired valuable constituent being adsorbed from the pregnant hydrometallurgical feed liquor, by a more or less attenuated saturation capacity, and by increased eluant requirements necessary to achieve a practical degree of recovery of the desired adsorbed constituent from the ion exchange resin.

It is an object of the present invention to provide an economical process for rejuvenating poisoned ion exchange resins.

It is a further object of the present invention to provide a process for rejuvenating poisoned ion exchange resins by the essentially quantitative removal from the resins of apparently irreversibly adsorbed or precipitated fouling materials, responsible for either chemical or mechanical fouling of the resins.

It is still a further object of the present invention to provide a process for the rejuvenation of poisoned strong base anion exchange resins which are fouled by metals such as bismuth, lead, tin, molybdenum, zirconium, titanium, hafnium, tungsten, chromium, iron, cobalt, and manganese, or substances such as silicates, phosphates and organic materials.

It is still a further object of the present invention to provide a process for rejuvenating poisoned ion exchange resins by treatment with aqueous reagents which are not detrimental either chemically or physically to the ion exchange resin.

Still other objects of the present invention will become apparent to those skilled in the art by reference to the following detailed description and the accompanying drawing, wherein:

FIGURE 1 illustrates the loading characteristics of a fresh strong base anion exchange resin as compared with the same resin (poisoned) after some 100 cycles, when the uranium containing hydrometallurgical feed liquor contained a minor proportion of poisoning materials;

FIGURE 2 illustrates the elution characteristics of the fresh and poisoned strong base anion exchange resin of FIGURE 1.

I have discovered that treatment of a poisoned ion exchange resin with a combination of suitable reagents will effectively strip poisonous materials which were apparently irreversibly adsorbed on the active ion exchange sites of the resin or apparently irreversibly precipitated in the resin matrix during many loading cycles. The most simple combination of inexpensive reagents has been determined to be a moderately strong alkaline solution, preferably an aqueous solution of about 5 to 10% by weight sodium or potassium hydroxide, either preceded or followed by treatment with a solution of moderately strong mineral acid, other than phosphoric acid. The treatment with alkaline solution may be followed by a treatment with 6–10% sodium chloride solution, which serves to convert the resin to the chloride form. Little, if any, metal contaminates are removed by treatment with the sodium chloride solution, but a considerable amount of organic color bodies are stripped during this treatment. This combination of reagents is effective in removing 90% or more of the materials responsible for poisoning of the resin along with an appreciable amount of organic color bodies, and the operating characteristics of the resin are restored to approximately that of the fresh resin with little or no apparent physical or chemical degradation of the resin.

Any sequence of the above acid-alkaline solution treatment may be used advantageously, as will be illustrated in the examples hereinafter, but the efficiency of the rejuvenation process in terms of cost of reagents and contact time varies according to the sequence employed. I have found that the most efficient sequence involved treatment with the alkaline solution before treatment with the acid solution, and further, that more complete rejuvenation in terms of contaminant stripping may be achieved by treating the resin with an alkaline carbonate solution prior to treatment with the alkaline solution. A bicarbonate solution may be used, but is not as effective as alkaline carbonate solution.

The percolation of an alkaline carbonate or bicarbonate solution through the resin bed effects stripping of a substance or substances which may be precipitated from the eluant on addition of either sodium hydroxide or acid. The substance or substances so eluted have been found to contain complexes of zirconium and titanium carbonates, along with significant quantities of molybdenum in most instances. Thus more effective stripping of such materials is accomplished through the use of alkaline carbonate solution or bicarbonate solution prior to treatment with moderately strong alkaline solution, and in addition, less of the moderately strong alkaline solution is required in the subsequent treatment.

When the ion exchange resin is poisoned to an appreciable extent by acid-insoluble metal phosphates, such as phosphates of zirconium and tin, a treatment with moderately strong alkaline solution, alkaline carbonate solution or bicarbonate solution prior to a subsequent acid treatment is particularly desirable. A metathesis occurs in such instances wherein the phosphate is exchanged for either hydroxide or carbonate, depending upon the reagent or reagents employed, and phosphate ion is eluted from the resin. Some stripping of substances such as zirconium, titanium and molybdenum may also occur provided alkaline carbonate solution or bicarbonate solution is used prior to treatment with moderately strong alkaline solution, as above mentioned. However, most of the poisoning metal contaminates remain in the resin as their hydroxides or carbonates and are readily susceptible to leaching by a subsequent acid treatment, which may be with a very dilute solution of a mineral acid other than phosphoric acid.

It will be appreciated from the foregoing that moderately strong acid is required to leach substances such as zirconium or titanium from an otherwise untreated positioned ion exchange resin. The mechanism by which such substances are removed by moderately strong acid is not clearly understood, but dilute acids are essentially ineffective in this instance. However, when the poisoned ion exchange resin has been treated with alkaline carbonate solution, bicarbonate solution or alkaline solution, prior to acid treatment, substances such as zirconium and titanium are then readily susceptible to leaching by even dilute acid reagents. For example, nitric, hydrochloric, sulfuric and mineral acids in general other than phosphoric acid, in concentrations of about 0.3 N or greater, will effectively remove a large percentage of substances such as zirconium and titanium from the resin provided an alkaline carbonate solution, bicarbonate solution or alkaline solution trtatment has preceded the acid treatment.

The terminology moderately strong acid, as used in the specification and claims, is intended to include aqueous solutions of mineral acids in general other than phosphoric acid, such as sulfuric, nitric, hydrochloric and hydrofluoric acids, the strength of each individual acid varying with the nature of the acid. For example, moderately strong sulfuric, nitric, hydrochloric and hydrofluoric acid strengths are intended to mean 6–18, 6–8, 6–12 and 6–12 Normal, respectively. The preferred moderately strong acid is 11 to 14 Normal sulfuric acid. Dilute acid in the specification and claims is intended to include aqueous solutions of the foregoing mineral acids with a lower limit of concentration of 0.3 Normal in each instance, with the upper limit being 6 Normal in each instance. The preferred dilute acid is aqueous sulfuric acid having a concentration of about 4 Normal.

The terminology moderately strong alkaline solution, as used in this specification and claims, is intended to include aqueous solutions containing about 2 to 30% by weight of a substance such as sodium carbonate, sodium hydroxide, potassium carbonate and potassium hydroxide, but preferably containing about 5 to 10% by weight of sodium or potassium hydroxide; while alkaline carbonate solution is intended to include aqueous solutions of substances such as sodium or potassium carbonate or sodium or potassium bicarbonate, but preferably containing sodium or potassium carbonate in a concentration of about 5 to 10% by weight.

An additional improvement particularly desirable for strong base (quaternary) anion exchange resins incorporates a treatment with a moderately strong acidic nitrate solution in the rejuvenation process. This nitrate solution is preferably 0.75–1.25 molar in nitrate ion and about 0.2–0.4 molar in hydrogen ion. Examples of suitable sources of nitrate ion are ammonium nitrate, sodium nitrate, potassium nitrate, magnesium nitrate, and calcium nitrate; while suitable sources of hydrogen ion are either nitric or sulfuric acid. The treatment with moderately strong acidic nitrate solution is more effective if carried out at some suitable point in the rejuvenation process before treatment with the alkaline carbonate solution or moderately strong alkaline solution, but even better results are obtained when the acidic nitrate solution treatment is the first step in the rejuvenation process. When this treatment is used as the first step in the rejuvenation process, relatively large quantities of uranium which deposited essentially irreversibly in the ion exchang resin, as well as metals such is iron, are stripped to an appreciable extent. The uranium may be recovered from the eluant and in quantities sufficient to pay a large proportion of the cost of the rejuvenation process. The nitrate ion also appears to exert a beneficial oxidizing effect on organic contaminants, as well as on partially reduced molybdenum and vanadium, and such contaminats are then found to respond more readily to stripping by other reagents which follow in the preferred sequence of the rejuvenation process.

Highly beneficial results are obtained by employing the aforementioned combination of reagents in any sequence, but the most effective stripping of all contaminants from poisoned ion exchange resins is achieved when the following sequence of reagents is employed:

(1) Acidified nitrate solution
(2) Wash (water)
(3) Alkaline carbonate solution
(4) Moderately strong alkaline solution
(5) Sodium chloride solution
(6) Dilute or moderately strong mineral acid solution (other than phosphoric acid)
(7) Rinse (water)

Most ion exchange resin beds after prolonged use are subjected to inter-bead fouling with macroscopic particles of solids carried in the hydrometallurgical feed liquors. Both the moderately strong alkaline solution and the moderately strong acid solution treatments exert a certain loosing and decrepitating effect upon aggregates of such materials, and a backwash step with water following either or both of these treatments is very beneficial. Backwash steps may follow other treatments within the above-mentioned preferred sequence, however, and have been found beneficial in reducing this type of contamination to a practical minimum.

One unexpected benefit resulting from the treatment of the poisoned ion exchange resin with moderately strong acid is the rejuvenated resin thus treated exhibits an increase in porosity over that of the fresh unused resin. This is achieved without physical or chemical deterioration of the resin, as will be demonstrated hereinafter in the examples. Such an increase in the porosity of the resin results in faster adsorption of the desired ion in the loading step, and also aids in achieving a more rapid elution in the regeneration step which normally follows the loading step. This unexpected property of the rejuvenated resin contributes toward an even more efficient and economical over-all process for the separation of desired values from pregnant hydrometallurgical feed liquors.

The following specific examples further illustrate the present invention.

EXAMPLE I

A fresh unused strong base (quaternary) anion exchange resin was contacted over numerous cycles with sulfuric acid leach liquor derived from a variety of Colorado Plateau uranium ores. This pregnant leach liquor contained approximately the following quantities of various substances in solution:

| Substance: | G./l. |
|---|---|
| $U_3O_8$ | 1.0–2.5. |
| $V_2O_5$ | 5–8. |
| $Al_2O_3$ | 4–6. |
| Fe | 3–10. |
| Mo | .03–.15. |
| $P_2O_5$ | 0.2–0.6. |
| Ti, Zr, Hf, Cr, Cu, $SiO_2$ | Traces. |
| Pb, Sn, Mn | Minor quantities. |

The fresh unused resin suffered a sharp decrease in saturation capacity after contacting with the above sulfuric acid leach liquor over some 145 cycles, and also exhibited the other usual symptoms of poisoning.

Samples of well eluted and dried resin were chosen at several stages during the foregoing 145 cycle operation and reserved for experimentation which will be further discussed in the following examples. One such sample was taken at the end of 40 cycles, and a second such sample was taken at the end of 100 cycles. Upon carbonization and ignition of these resin samples, the ash content of the 40 cycle resin was found to be 9.1%, whereas the ash content of the 100 cycle resin had increased to 14.6%, thus confirming that the poisoning is essentially of an inorganic origin. Among the constituents of the ash as determined by spectographic analysis were the following substances: Pb, Fe, Al, Sn, Si, Mg, Ca, P, V, Mo, U, Na, Ti, Zr, Hf, Sr, Cu, Cr, and Mn. The chief contaminants among these substances appear to be Mo, Ti, Zr, Si and P. Relatively large quantities of phosphorus were present, and suggested the possibility of considerable intra-resin precipitation of zirconium as the highly insoluble phosphate.

The following characteristics of a fresh resin sample and the poisoned resin samples taken at various stages, such as at 40 cycles and at 100 cycles, were determined for the purpose of determining the performance of the various resin samples and the effectiveness of the rejuvenation process:

(1) Break-through capacity for uranium sulfate complex
(2) Saturation capacity
(3) Total anion exchange capacity
(4) Quaternary capacity
(5) Ash content
(6) Ease of elution The loading characteristics were determined with a synthetic uranium liquor containing uranium in concentrations of 1.0 g./l. calculated as $U_3O_8$. A sulfate background of 30 g./l. $SO_4^-$ was provided in the form of magnesium sulfate and the pH of the feed liquor was adjusted to 1.5. Break-through for the purpose of comparison of the various samples in the following experiments was arbitrarily defined as a leakage of 10 mg./l. $U_3O_8$ and the break-through capacity was defined as the loading in mg. of $U_3O_8$ per ml. of wet settled resin at which time a leakage of 10 mg./l. $U_2O_8$ occurred. The feed rate for a 75 ml. column of resin was 10 ml./min. After the determination of break-through capacity in this manner, the resin was then loaded to saturation with an excess of feed liquor and the washed column eluted with 0.9 N NaCl–0.1 N HCl eluant. The effluent was then analyzed for uranium in order to determine the "barrenness" of the effluent, which indicated the rapidity or ease of elution.

Quaternary capacity was determined on a washed sample of the resin in the hydroxide form by passing through an excess of 6–10% NaCl solution and then determining the quantity of alkali thus generated. The total anion exchange capacity was determined on the chloride form of the resin in the usual manner well known in the art. The ash content was determined on well eluted and dried samples of resin by the usual process of carbonization and ignition.

The results of data obtained by the foregoing procedures appear in FIGS. 1 and 2 of the drawings, as well as in the following examples.

EXAMPLE II

A 75 ml. sample of poisoned strong base (quaternary) anion exchange resin (after contact over a period of 40 cycles with feed liquor; ash content 9.1%) was obtained in the manner of Example I. This resin sample was placed in a column and backwashed with distilled water until substantially free from fine solids. Strong sulfuric acid (100 ml. 66° Bé $H_2SO_4$–200 ml. $H_2O$) at room temperature was then percolated through the resin bed over a period of 5 hours, followed by percolating a more dilute sulfuric acid (100 ml. 66° Bé $H_2SO_4$–500 ml. $H_2O$) through the resin bed over a second five hour period. The total acid feed was equivalent to about 8 bed volumes of strong sulfuric acid (100 ml. 66° Bé $H_2SO_4$–200 ml. of $H_2O$). The effluent was deep yellow in color and contained an appreciable quantity of uranium along with significant but smaller quantities of Ti, Mo, Zr and Fe. The uranium was recovered in crude form by neutralizing the effluent to a pH of 7 with ammonium hydroxide or sodium hydroxide and filtering off the precipitate which formed.

After the above acid treatment, the resin was washed and then backwashed with water to remove excess acid and deflocculated solids, and then treated with 700 ml. of 6% NaOH solution over a period of about eight hours. The effluent from this step was deep orange-red in color and contained considerable quantities of Mo and $SiO_2$ in addition to organic color bodies. The resin was then backwashed with water to remove additional quantities of deflocculated macroscopic solids, and then converted to the chloride form by percolation of 300 ml. of 10% NaCl solution through the resin bed. This treatment removed a further quantity of organic color bodies but little, if any, metal-containing contaminants. Finally, the resin was rinsed thoroughly with water to remove excess salt. The resin thus rejuvenated is compared below in Table I with fresh unused resin and an additional sample of the poisoned (40 cycle) untreated resin.

*Table I.—Comparison of 40 cycle resin before and after rejuvenation*

| Characteristic | Poisoned Resin | Rejuvenated Resin | Fresh Resin |
|---|---|---|---|
| Break-through capacity, mg./ml. | 36 | 43 | 52–56 |
| Saturation capacity, mg./ml. | 49 | 67.4 | 72 |
| Eluant: $U_3O_8$ concentration of 10th bed volume, g./l. | 0.49 | 0.2 | |
| Percent ash | 9.1 | 0.55 | |
| Anion exchange capacity (meq./gram) | 3.17 | 3.70 | 3.76 |
| Quaternary capacity (meq./gram) | 2.74 | 3.31 | 3.44 |

EXAMPLE III

A 67 ml. sample of poisoned 40 cycle resin identical with that of Example II was placed in a column and eluted with 10 bed volumes of 0.333 N HCl–0.666 N NaCl eluant, and then treated successively (at 1 gal./ft.³/min. rate) as follows:

*Step 1.*—1900 ml. of sulfuric acid (1 volume 66° Bé $H_2SO_4$–2 volumes $H_2O$).

*Step 2.*—1000 ml. of $H_2O$.

*Step 3.*—1000 ml. 10% NaOH solution.
*Step 4.*—1000 ml. 10% NaCl solution.

Wet screen analysis was carried out on the resin before and after the rejuvenation treatment for the purpose of determining if any appreciable physical degradation of the resin had occurred. The following results were obtained.

| Screen Size | 40 Cycle Resin Before Rejuvenation, ml. | 40 Cycle Resin After Rejuvenation, ml. |
|---|---|---|
| +20 | 1.2 | 1.2 |
| +30 | 19.2 | 16.9 |
| +40 | 38.5 | 40.0 |
| +50 | 7.6 | 8.2 |
| −50 | 0.4 | 0.6 |
| Total vol. | 66.9 | 66.9 |
| Ash, percent | 9.1 | 0.60 |

The results tabulated in the foregong table indicate that little, if any, physical degradation of the resin occurred as a result of the rejuvenation treatment.

Loading and elution characteristics of the 40 cycle resin thus rejuvenated were determined to be as follows:

| Characteristic | 40 Cycle Rejuvenated Resin, mg./ml. | 40 Cycle Poisoned Resin, mg./ml. |
|---|---|---|
| Break-through capacity | 52 | 36 |
| Saturation capacity | 68 | 49 |
| Elution: $U_3O_8$ conc. after 13 bed volumes eluant | <10 | [1] 214 |

[1] Liters.

It is apparent from the foregoing results that a more prolonged acid treatment (27 bed volumes as compared with 8 in Example II) will improve the break-through capacity of the resin despite the fact that the ash content, which is indicative of the extent of poisoning, was about the same in each instance. The longer period of contact with sulfuric acid also effects more complete removal of organic fouling agents. It was also found that smaller quantities of reagent at longer periods of retention are about as effective as larger quantities of reagent at shorter periods of retention.

EXAMPLE IV

A 75 ml. sample of washed 40 cycle resin obtained in the manner of Example I and identical with the 40 cycle resin of Example II was placed in a column and treated successively as follows without an additional elution step being carried out prior to such treatment:

*Step 1.*—335 ml. of sulfuric acid (100 ml. 66° Bé $H_2SO_4$–250 ml. $H_2O$) was percolated through the resin bed over a 10 hour period. The effluent gave strong positive qualitative tests for Zr, Ti, Fe, U and the sulfide group metals (Mo. etc.). The resin was then washed with water.

*Step 2.*—200 ml. of 0.25 N $HNO_3$–0.8 N $NH_4NO_3$ solution was fed to the column at a rate of 1 ml. per minute.

*Step 3.*—The resin was then rinsed with 500 ml. of water for the purpose of washing the resin essentially free of excess acid, but not completely so.

*Step 4.*—325 ml. of 10% $Na_2CO_3$ solution was then percolated through the column at the rate of 1½ ml./min. This treatment effected removal of a considerable quantity of organic color bodies and phosphate, along with small amounts of Mo, Zr and Ti. At the end of this treatment, a base-precipitable material believed to be complexed zirconium carbonate was still to be found in the effluent solution. This was confirmed by precipitating the material with base, filtering, washing the residue and dissolving the residue in moderately strong sulfuric acid. The addition of $H_3PO_4$ to this sulfuric acid solution produced a precipitate having the characteristics of zirconyl phosphate.

*Step 5.*—600 ml. of 10% NaOH solution was then percolated through the resin bed over a 12 hour period. Some Mo was still evident in the effluent at the end of this treatment. The column was washed with water briefly before proceeding with the next step.

*Step 6.*—The resin was converted to the chloride form by percolation of 10% NaCl solution (325 ml. at 1.5 ml./min.) through the column. Organic color bodies again appeared in the effluent, and additional molybdenum was stripped by this treatment.

*Step 7.*—The resin was further treated briefly with 0.3 N HCl. This treatment effected additional removal of a metal ion precipitable by addition of either caustic or $H_3PO_4$, which is indicative of zirconium.

A portion of the resin thus rejuvenated was then washed with water, dried and ashed in the usual manner, and found to contain 0.67% ash. Identified among the constituents of the ash were Zr and Ti, but the presence of Mo was questionable.

The rejuvenated resin had a break-through capacity of 51.5 mg./ml. and a saturation capacity in excess of 60 mg./ml.

On elution with 0.9 N NaCl–0.1 N Hcl solution, the effluent contained 7.5 mg. $U_3O_8$/l. after passage of 11 column volumes of eluant, whereas the untreated poisoned resin after elution with 13.5 column volumes of eluant afforded an effluent having a concentration of 214 mg./l. $U_3O_8$. Thus the rejuvenated resin has greatly improved elution characteristics.

EXAMPLE V

Alkaline solutions containing sodium chloride are more effective stripping reagents for molybdenum than are simple alkaline solutions not containing sodium chloride. However, it may be demonstrated that an alkaline solution containing sodium chloride is no more effective as a stripping reagent for zirconium and titanium than a simple alkaline solution.

A sample of a poisoned strong base (quaternary) anion exchange resin (100 cycles) was obtained in the manner described in Example I, the resin sample being identical with that of the preceding examples with the exception of a higher degree of poisoning being present. This resin sample was placed in a column and then treated successively at the rate of 1 gal./ft.³/min. with the following reagents:

*Step 1.*—Sulfuric acid (1 part by vol. 66° Bé $H_2SO_4$ to 2 parts by vol. $H_2O$) until the effluent gave no precipitate on addition of base (30 column volumes).

*Step 2.*—Rinse and backwash with water.

*Step 3.*—15 column volumes of 10% NaOH–10% NaCl solution.

*Step 4.*—15 column volumes of 10% NaCl solution.

*Step 5.*—Water rinse.

A portion of the resin thus rejuvenated was then subjected to wet screen analysis and other additional tests for the purpose of determining if any appreciable degradation had occurred during the rejuvenation process. The rejuvenated resin is compared with untreated poisoned resin in the table below:

| Screen Size | 100 Cycle Poisoned Resin, ml. | 100 Cycle Rejuvenated Resins, ml. |
| --- | --- | --- |
| +20 | 3.8 | 2.6 |
| +30 | 24.5 | 23.0 |
| +40 | 29.0 | 32.5 |
| +50 | 6.2 | 6.2 |
| −50 | 0.8 | 0.8 |
| | 64.3 | 65.1 |
| Percent moisture | 41.1 | 45.1 |
| Percent ash | 14.57 | 1.5 |
| Total Anion Exchange Capacity | 3.02 | 3.71 |
| Quaternary | 2.54 | 3.27 |

Other characteristics of the rejuvenated resin and the poisoned untreated resin was determined by the following procedure:

20.0 ml. samples of each resin were contacted with a synthetic solution containing:

1.02 g. $U_3O_8$/l.
30 g. $SO_4^{--}$/l. (added as $Na_2SO_4$)
pH was adjusted to 1.5

The load flow rate was 1 gal./ft.³/min. with a retention time of 3.0 minutes; the elution flow rate was 0.2 gal./ft.³/min. with a retention time of 15.0 minutes; and the eluate composition was 1 N NaCl–0.1 N $H_2SO_4$. The data thus obtained is tabulated below:

LOADING CHARACTERISTICS

| Bed Volumes Effluent | Uranium Leakage | |
| --- | --- | --- |
| | 100 Cycle Poisoned Resin | 100 Cycle Rejuvenated Resin |
| 11–15 | 0.012 g./l. $U_3O_8$. | |
| 16–20 | 0.016 g./l. | |
| 21–25 | 0.024 g./l. | |
| 26–30 | 0.026 g./l. | 0.002 g./l. |
| 31–35 | 0.077 g./l. | 0.002 g./l. |
| 36–40 | 0.128 g./l. | 0.002 g./l. |
| 41–45 | | 0.019 g./l. |
| Bed volumes eluate required to barren | 19 | 12. |

EXAMPLE VI

The foregoing examples which illustrate the rejuvenation process of the invention are all concerned with treatment of the poisoned resin with an acidic reagent followed by a subsequent treatment with an alkaline reagent. This and the following examples illustrate the definite improvement obtained by first treating the poisoned resin with an alkaline reagent followed by treatment with an acidic reagent.

A 75 ml. sample of poisoned 100 cycle resin identical with that of Example V was placed in a column and then treated with six column volumes of 10% NaOH–10% NaCl solution over a 15 hour period. The first effluent to issue from the column after displacement of a void volume contained significant amounts of phosphate and molybdate but qualitative tests for these ions were essentially negative at the end of the treatment.

The column was washed and backwashed with water to remove excess reagent and deflocculated solids, and then converted to the chloride formed by percolation of six column volumes of 6% NaCl solution through the resin bed. This treatment effected removal of a small amount of organic color bodies but little, if any metal-containing contaminants. The column was then briefly rinsed with water.

4 N sulfuric acid was percolated through the resin bed at a retention time of one hour (e.g. at the rate of one void volume of reagent per hour) until six column volumes had been passed through. The initial acidic effluent contained very large quantities of Ti, Zr and Fe. The concentration of these metals in the effluent gradually diminished as the elution progressed until at the end of the treatment qualitative tests for Fe and Ti were essentially negative, while only a trace of Zr appeared to be present. The resin thus rejuvenated was washed and dried. A sample was found to contain 0.71% ash, as compared with 1.5% ash for the rejuvenated resin of Example V.

A second sample of the poisoned 100 cycle resin was treated with 4 N sulfuric acid in the manner described above, with the exception that the sulfuric acid treatment was made before an alkaline treatment. Treatment of the poisoned resin with 4 N sulfuric acid prior to the above alkaline treatment effected removal of only a trace of iron and titanium, and no detectable quantity of zirconium.

EXAMPLE VII

A 75 ml. sample of 100 cycle (14.6% ash) resin identical with that of Example V was placed in a column and treated successively as follows:

*Step 1.*—Elution at 20 minutes retention time with 9 column volumes of 0.8 N $NH_4NO_3$–0.25 $NH_2SO_4$. The effluent contained significant quantities of $U_3O_8$ and iron. Uranium was recovered from the effluent as a crude ammonium diuranate by neutralization to a pH of 7.0 with concentrated ammonium hydroxide.

*Step 2.*—The column was washed with 7 column volumes of water.

*Step 3.*—The resin bed was percolated with 7 column volumes of 10% $Na_2CO_3$ solution at the rate of 1 cc. per minute (30 minutes retention time). The orange effluent was tested at intervals by addition of NaOH solution. After treatment of the resin with 6 column volumes eluant, the effluent was free of base precipitable material, although considerable quantities of Mo and lesser amounts of phosphate were still being eluted.

A spectographic analysis of the carbonate effluent showed Mo, Zr, V, Ti, Hf present as major constituents, along with minor to trace quantities of Fe, Al, Ca, Mg and Cu.

An additional sample of the carbonate effluent was made strongly basic with NaOH. A precipitate was formed which was collected and thoroughly washed. Spectographic analysis of this precipitate revealed the major constituent to be zirconium, along with an almost equal quantity of titanium. In addition, smaller quantities of Si, Hf, Cu and Fe were found to be present.

*Step 4.*—Eight column volumes of 10% NaOH solution were then percolated through the column at 20 to 30 minute retention time. The composite NaOH effluent was analyzed spectographically and Mo, V and Si were found to be present as major constituents, along with minor to trace quantities of Ca, Fe, Al and Mg.

*Step 5.*—The resin bed was washed and backwashed with water to remove deflocculated macroscopic solids, and then 6 column volumes of 10% NaCl solution was percolated through the resin bed. The effluent contained a considerable quantity of organic color bodies and upon spectographic analysis minor amounts of Mo, Ca, Al, Fe, Sr, Si and Mg were found to be present.

A sample of the resin treated as outlined above was thoroughly washed with distilled water to remove sodium chloride and dried. The dried sample was then carbonized and ignited, and found to contain 3.45% ash as compared with 14.6% ash in the untreated resin. Spectographic analysis of the ash showed the major constituents to be Zr and Ti, along with significant quantities of Fe, Hf, Si and Ca, and trace quantities of Al, Sr, Mg, V, Cr, Pb, Sn and Mn. The presence of molybdenum was doubtful.

*Step 6.*—The resin was then treated at room temperature and without an intermediate wash with sulfuric acid (100 ml. 66° Bé. $H_2SO_4$–250 ml. $H_2O$) at a relatively long residence time (18–20 hours to feed 4.5 column volumes of acid). The first effluent contained large quantities of Fe, Ti and Zr, but the concentration of these metals diminished as the treatment progressed. At the end of the treatment the qualitative tests showed only trace quantities of Fe, Ti and Zr to be present.

The sulfuric acid effluent was analyzed spectographically with the following results:

Major constituents: Zr, Ti
Minor constituents: Fe, Ca, Hf, Sr, Cu
Trace quantity: Si, Al, Mg, Cr.

*Step 7.*—The resin was thoroughly washed and backwashed with water. A sample of the washed resin was dried and ashed in the usual manner, the ash amounting to 0.11% based on the weight of the dried resin. Therefore 99.25% of the ash originally in the poisoned resin was removed by the foregoing rejuvenation treatment.

The rejuvenated resin had a break-through capacity of 54 mg./ml., a saturation capacity of 63–66 mg./ml. and elution of a saturated rejuvenated resin column with 12 column volumes of 0.9 N NaCl–0.1 N HCl afforded an effluent at 12 column volumes assaying less than 10 mg./l. $U_3O_8$.

EXAMPLE VIII

In order to determine the efficiencies of various dilute acids as stripping agents subsequent to an alkaline treatment and to compare reagent requirements for equivalent stripping of metals, several identical samples of poisoned strong base (quaternary) ion exchange resins were given the following treatment prior to acid stripping:

*Step 1.*—Elution with 9 bed volumes of 0.9 N $NH_4NO_3$–0.25 N $H_2SO_4$ over a 6 hour period.

*Step 2.*—Water wash.

*Step 3.*—Elution with 10% $Na_2CO_3$ solution over a 12 to 20 hour period. The carbonated solution was introduced as a highly diluted solution at the beginning of the treatment and until the effluent pH rose to about 6 or 7, then the full strength carbonate solution was used. Treatment was continued until the effluent gave no precipitate on treatment with NaOH and the molybdate test for phosphate gave only a faint test. This treatment required about 9 bed volumes of reagent.

*Step 4.*—10% NaOH solution over a 12 hour period, or until the effluent showed only a trace of molybdenum to be present. About 8–10 bed volumes were required for this treatment.

*Step 5.*—Rinse and backwash with water for the purpose of removing loosened solids.

*Step 6.*—Treatment with 10% NaCl solution over a 5–8 hour period until the effluent was essentially colorless. About 5–8 bed volumes of sodium chloride solution were required.

*Step 7.*—Acidic elution step and rinse. The results of using different acidic elution reagents in Step 7 is shown in the following table:

| Reagent | Bed Volumes | Hours Residence | Percent Ash Poisoned Resin | Percent Ash Rejuvenated Resin |
|---|---|---|---|---|
| 12 N HCl | 9 | 40 | 14.6 | 0.32 |
| 1 N HCl–1 N NaCl | 9 | 40 | 14.6 | 0.17 |
| 1 N HCl–1 N NaCl | 18 | 25 | 13.5 | 0.63 |
| 2 N $HNO_3$ | 7 | 40 | 14.6 | 0.11 |
| 2 N $H_2SO_4$ | 11 | 40 | 14.6 | 0.33 |
| 4 N $H_2SO_4$ | 7 | 30 | 13.5 | 0.58 |
| 11 N $H_2SO_4$ followed by 0.5 N $H_2SO_4$ | 2.5 / 1.0 | 26 / 4 | 13.5 | 0.54 |
| 11 N $H_2SO_4$ | 4.5 | 20 | 14.5 | 0.11 |

It will be apparent upon examination of the preceding table that essentially any mineral acid (excepting phosphoric acid) may be used over a wide range of concentrations to effectively complete the rejuvenation process, provided an alkaline elution step has preceded the acid treatment. The effect of residence time is also quite marked, and in the practice of this invention, a judicious choice should be made between quantity and concentration of reagent and contact time incurred in the treatment. Thus, for example, 9 column volumes of 1:2 $H_2SO_4$ is about as effective over a 12 hour period as are 3 column volumes of the same reagent over a 24–30 hour period.

EXAMPLE IX

A fresh, unused strong base quaternary anion exchange resin (IRA–400) contacted with an acidic uranium-free solution containing dissolved values of Mo, Fe, Bi, Si, P, Cr, Zr, Ti and W over a period of several weeks becomes poisoned with one or more of the foregoing constituents. Upon washing and drying followed by carbonization and ignition the residual ash of the resultant poisoned resin is at least 3% or higher.

Rejuvenation of the resultant poisoned resin may be effected by treatment with 10 column volumes of 10% NaOH–10% NaCl over an eight hour contact time, followed by a water wash with 4 column volumes of water, followed by treatment with 6 column volumes of 10% sodium chloride over a four hour period, followed by treatment with 6 column volumes of 6 Normal HCl over a 12 hour contact time, and finally a water wash. Upon drying, carbonization and ignition a sample of the resultant rejuvenated resin contains about 0.02% or less residual ash. Thus, the resin may be rejuvenated to substantially its original capacity.

EXAMPLE X

A fresh, unused strong base quaternary anion exchange resin of a different type (Permutit SK) was contacted over a period of several weeks with an acidic, uranium-free solution containing a number of poisoning constituents such as dissolved values of molybdenum, iron, bismuth, silica, phosphate, chromium, zirconium, titanium and tungsten, until the resin was poisoned. The poisoned resin was washed well, dried, and then carbonized and ignited to determine the residual ash, which was 2.96%.

The above poisoned resin was then treated according to the following scheme, with the indicated results:

| Step | Treatment | Observations |
| --- | --- | --- |
| 1 | 10 column volumes of 10% NaOH—10% NaCl over an eight hour contact time. | The effluent contained much Mo and phosphate, and lesser amounts of W and silica. |
| 2 | Water wash with 4 column volumes. | |
| 3 | Treatment with 6 column volumes of 10% NaCl over a four hour contact time. | |
| 4 | Treatment with 6 column volumes of 6 Normal HCl over a twelve hour contact time. | The effluent was rich in Ti and Zr. At the end of the treatment there was no further elution of metal values. |
| 5 | Water wash. | |

A sample of the above rejuvenated resin was dried, charred and ignited, and the residual ash was found to be only 0.02%. Therefore, the resin was rejuvenated to substantially its original capacity.

EXAMPLE XI

A strong base anion exchange resin based on a quaternized cross-linked vinyl pyridine polymer (Permutit SK) employed in recovering uranium as the anionic sulfate complex from sulfuric acid leach liquors exhibits gradual loss of capacity with repeated cycling, this loss of capacity being correlatable with the build-up of precipitated and/or irreversibly adsorbed substances deposited from the uranium leach liquor. Treatment of such poisoned resin according to the method of Example II, or according to the methods of Examples VI and VII results in almost complete restoration of the original light color of the resin, and very marked improvement in the uranium loading and eluting characteristics. Upon ignition, the resin has a very low ash content which approaches the ash content of the fresh unused resin.

It will be obvious to those skilled in the art that the sequence of the various treatments described hereinbefore need not be strictly adhered to. However, the preferred sequence of treatments will give better results and is more economical in operation. It is also obvious that each of the individual treating reagents may be used more than once in the rejuvenating process. For example, given quantities of sodium hydroxide solution may be used both before and after treatment with an acidic reagent. Likewise the quantities of reagent to be employed may vary widely, it being understood that the quantity of reagent to be employed in each instance is that quantity necessary to achieve stripping of contaminates to a practical level.

The temperature at which the various steps of the rejuvenation process are carried out is a function of the chemical nature of the treating agent, the concentration of the treating agent, the nature of the poisoning materials present in the resin, and the nature of the particular ion exchange resin. For example, a higher temperature may be safely used with a non-oxidizing mineral acid than with an oxidizing mineral acid, or higher temperatures may be used with dilute reagents than may be used with concentrated reagents. The preferred temperature to be employed is usually about 30–60° C., but in some instances temperatures up to about 80° C. may be desirable. Higher temperatures involve risk of damaging the ion exchange resin and, in general, no particular advantage is gained by using high temperatures.

The specific strong base (quaternary) anion exchange resin illustrated in Examples I through IX may be identified as divinyl benzene—crosslinked polystyrene containing quaternary ammonium groups. This anion exchange resin is available commercially as a proprietary product of Rohm and Haas Co. and is identified as IRA–400. The specific strongly basic anion exchange resin employed in Examples X and XI may be identified as being a quaternized crosslinked (poly) alkyl vinyl pyridine available commercially as a proprietary product identified as Permutit SK. It will be appreciated by those skilled in the art that the rejuvenation process described herein is effective for any strongly basic anion exchange resin provided the resin is not appreciably degraded by the rejuvenation reagents under the conditions of the rejuvenation process.

While the foregoing discussion has been largely concerned with the recovery of uranium as an anionic complex from leach liquors, it is understood that the invention is not limited to the rejuvenation of ion exchange resin poisoned thereby. For instance, the rejuvenation process of the present invention is equally useful in the rejuvenation of resin poisoned during the recovery from solution of other dissolved metal values or desired components wherein the solution contacted with the resin contains one or more of the poisoning constituents mentioned herein. For instance, the strongly basic anion resin may be poisoned during repeated cycles in a process for recovering metal values from solution including an adsorption step wherein regenerated resin is contacted with the solution to adsorb metal values, a regeneration step wherein metal values are desorbed from the resin by stripping with a strip solution and a step wherein the resultant regenerated resin is recycled to the adsorption step, with the poisoned resin containing values of at least one poisoning substance referred to herein which is removed from the solution during the adsorption step and incompletely stripped from the resin during the regeneration step. Thus, the rejuvenation process of the invention is useful for removing poisoning constituents from resin contacted with a solution containing the poisoning constituents, regardless of the nature of the specific process in which the resin is used.

The foregoing detailed description and specific examples are for the purpose of illustration only and are not to be taken as limiting to the spirit or scope of the appended claims.

What is claimed is:

1. A process for rejuvenating poisoned, strongly basic, aromatic anion exchange resin containing quaternary ammonium groups; the resin being poisoned during repeated cycles in a process for the recovery of uranium values from hydrometallurgical leach liquor containing uranyl sulfate complex including an adsorption step wherein regenerated resin is contacted with the leach liquor to adsorb uranium values, a regeneration step wherein uranium values are desorbed from the resin by stripping with a strip solution and a step wherein the resultant regenerated resin is recycled to the adsorption step; the poisoned resin containing values of at least one substance present in solution in the leach liquor selected from the group consisting of Bi, Cr, Fe, Hf, Mn, Mo, Pb, Sn, Ti, Zr, W, P and Si which is removed from the leach liquor the adsorption step and incompletely stripped from the resin during the regeneration step thereby resulting in poisoning of the resin; comprising the steps of contacting the poisoned resin with an aqueous solution of mineral acid selected from the group consisting of about 0.3–18 Normal sulfuric acid, about 0.3–8 Normal nitric acid, about 0.3–12 Normal hydrochloric acid and about 0.3–12 Normal hydrofluoric acid, and contacting the resin with an aqueous solution containing about 2–30% by weight of an alkaline substance selected from the group consisting of alkali metal hydroxides, alkali metal carbonates, alkali metal bicarbonates, ammonium hydroxide, ammonium carbonate, and ammonium bicarbonate, the resin contacting steps being performed without regard to sequence when the aqueous solution of mineral acid is at least 6 Normal and when it is less than 6 Normal the resin contacting step with the aqueous solution of alkaline substance preceding the resin contacting step with the aqeuous solution of mineral acid.

2. The process of claim 1 wherein a water rinse follows at least one of the resin contacting steps.

3. The process of claim 1 wherein the resin is contacted with a 5–10% sodium chloride solution following at least one of the resin contacting steps.

4. The process of claim 1 wherein the aqueous solution of mineral acid is about 11–14 Normal sulfuric acid and the aqeuous solution of alkaline substance contains about 5–10% by weight of an alkaline metal hydroxide.

5. A process for rejuvenating poisoned, strongly basic, aromatic anion exchange resin containing quaternary ammonium groups; the resin being poisoned during repeated cycles in a process for the recovery of uranium values from hydrometallurgical leach liquor containing uranyl sulfate complex including an adsorption step wherein regenerated resin is contacted with the leach liquor to adsorb uranium values, a regeneration step wherein uranium values are desorbed from the resin by stripping with a strip solution and a step wherein the resultant regenerated resin is recycled to the adsorption step, the poisoned resin containing values of at least one substance present in solution in the leach liquor selected from the group consisting of Bi, Cr, Fe, Hf, Mn, Mo, Pb, Sn, Ti, Zr, W, P and Si which is removed from the leach liquor during the adsorption step and incompletely stripped from the resin during the regeneration step thereby resulting in poisoning of the resin; comprising the steps of contacting the poisoned resin with an aqueous solution containing about 2–30% by weight of an alkaline substance selected from the group consisting of alkali metal hydroxides, alkali metal carbonates, alkali metal bicarbonates, ammonium hydroxide, ammonium carbonate, and ammonium bicarbonate and then contacting the resin with an aqueous solution of mineral acid selected from the group consisting of about 0.3–18 Normal sulfuric acid, about 0.3–8 Normal nitric acid, about 0.3–12 Normal hydrochloric acid and about 0.3–12 Normal hydrofluoric acid.

6. The process of claim 5 wherein the aqueous solution of mineral acid is about 11–14 Normal sulfuric acid solution and the aqueous solution of alkaline substance contains 5–10% by weight of an alkali metal hydroxide.

7. The process of claim 5 wherein the resin is contacted with an aqueous acidic solution of nitrate ion.

8. The process of claim 5 wherein the resin is contacted with at least 2 portions of the aqueous solution of alkaline substance, the alkaline substance in one portion of the aqueous solution being a salt of carbonic acid.

9. The process of claim 8 wherein the aqueous solutions of alkaline substance contain about 5–10% by weight of alkaline substance and the aqueous solution of mineral acid is about 11–14 Normal sulfuric acid.

10. The process of claim 8 wherein the resin is contacted with an aqueous acidic solution of nitrate ion that is about 0.75–1.25 molar in nitrate ion and about 0.2–0.4 molar in hydrogen ion, the solutions of alkaline substance contain about 5–10% by weight of alkaline substance and the aqueous solution of mineral acid is about 11–14 Normal sulfuric acid.

11. A process for rejuvenating poisoned strongly basic, aromatic anion exchange resin containing quaternary ammonium groups; the resin being poisoned during repeated cycles in a process for the recovery of uranium values from hydrometallurgical leach liquor containing uranyl sulfate complex including an adsorption step wherein regenerated resin is contacted with the leach liquor to adsorb uranium values, a regeneration step wherein uranium values are desorbed from the resin by stripping with a strip solution and a step wherein the resulting regenerated resin is recycled to the adsorption step; the poisoned resin containing values of at least one substance present in solution in the leach liquor selected from the class consisting of Bi, Cr, Fe, Hf, Mn, Mo, Pb, Sn, Ti, Zr, W, P and Si which is removed from the leach liquor during the adsorption step and incompletely stripped from the resin during the regeneration step thereby resulting in poisoning of the resin; comprising the steps of eluting the poisoned resin with an aqueous acidic solution of nitrate ion, followed by eluting the resin with a 5–10% by weight aqueous solution of alkaline carbonate until the effluent is substantially free of poisonous substances precipitatable by sodium hydroxide, followed by eluting the resin with a 2–30% by weight aqueous solution of alkali metal hydroxide until the effluent is substantially free of phosphate, silicate, molybdate and organic color bodies, and then eluting the resin with an aqueous solution of mineral acid selected from the group consisting of 0.3–18 Normal sulfuric acid, 0.3–8 Normal nitric acid, 0.3–12 Normal hydrochloric acid and 0.3–12 Normal hydrofluoric acid until the effluent is substantially free of poisonous substances removable thereby.

12. The process of claim 11 wherein the aqueous acidic solution of nitrate ion is about 0.75–1.25 molar in nitrate ion and about 0.2–0.4 molar in hydrogen ion, the solution of alkali metal hydroxide is a 5–10% by weight solution and the aqueous solution of mineral acid is 11–14 Normal sulfuric acid.

13. A process for rejuvenating poison strongly basic aromatic anion exchange resin; the resin being poisoned during repeated cycles in a process for the recovery of desired dissolved metal values from an aqueous hydrometallurgical liquor including an adsorption step wherein regenerated resin is contacted with the liquor to adsorb the said metal values, a regeneration step wherein the said adsorbed metal values are desorbed from the resin by stripping with a strip solution and a step wherein the resultant regenerated resin is recycled to the adsorption step; the poisoned resin containing values of at least one substance present in the solution selected from the group consisting of Bi, Cr, Fe, Hf, Mn, Mo, Pb, Sn, Ti, Zr, W, P and Si which is removed from the solution during the adsorption step and incompletely stripped from the resin during the regeneration step; comprising the steps of contacting the poisoned resin with an aqueous solution of mineral acid selected from the group consisting of about 0.3–18 Normal sulfuric acid, about 0.3–8 Normal nitric acid, about 0.3–12 Normal hydrochloric acid and about 0.3–12 Normal hydrofluoric acid, and contacting the resin with an aqueous solution containing about 2–30% by weight of an alkaline substance selected from the group consisting of alkali metal hydroxides, alkali metal carbonates, alkali metal bicarbonates, ammonium hydroxide, ammonium carbonate and ammonium bircarbonate, the resin contacting steps being performed without regard to sequence when the aqueous solution of mineral acid is at least 6 Normal and when it is less than 6 Normal the resin contacting step with the aqueous solution of alkaline substance preceding the resin contacting step with the aqueous solution of mineral acid.

14. A process for rejuvenating poisoned strongly basic aromatic anion exchange resin; the resin being poisoned during repeated cycles in a process for the recovery of desired dissolved metal values from an aqueous hydrometallurgical liquor including an adsorption step wherein regenerated resin is contacted with the liquor to said adsorb the said metal values, a regeneration step wherein the said adsorbed metal values are desorbed from the resin by stripping with a strip solution and a step wherein the resultant regenerated resin is recycled to the adsorption step; the poisoned resin containing values of at least one substance present in the solution selected from the group consisting of Bi, Cr, Fe, Hf, Mn, Mo, Pb, Sn, Ti, Zr, W, P and Si which is removed from the solution during the adsorption step and incompletely stripped from the resin during the regeneration step; comprising the steps of contacting the poisoned resin with an aqueous solution containing about 2–30% by weight of an alkaline substance selected from the group consisting of alkali metal hydroxides, alkali metal carbonates, alkali metal bicarbonates, ammonium hydroxide, ammonium carbonate, and ammonium bicarbonate and then contacting the resin with an aqueous solution of mineral acid selected from the group consisting of about 0.3–18 Normal sulfuric acid, about 0.3–8 Normal nitric acid, about 0.3–12 Normal hydrochloric acid and about 0.3–12 Normal hydrofluoric acid.

15. A process for rejuvenating strongly basic aromatic anion exchange resin; the resin being poisoned during repeated cycles in a process for the recovery of desired dissolved metal values from an aqueous hydrometallurgical liquor including an adsorption step wherein regenerated resin is contacted with the liquor to adsorb the said metal values, a regeneration step wherein the said adsorbed metal values are desorbed from the resin by stripping with a strip solution and a step wherein the resultant regenerated resin is recycled to the adsorption step; the poisoned resin containing values of at least one substance present in the solution selected from the group consisting of Bi, Cr, Fe, Hf, Mn, Mo, Pb, Sn, Ti, Zr, W, P and Si which is removed from the solution during the adsorption step and incompletely stripped from the resin during the regeneration step; comprising the steps of eluting the poisoned resin with an aqueous acidic solution of nitrate ion, followed by eluting the resin with a 5–10% by weight aqueous solution of alkaline carbonate until the effluent is substantially free of poisonous substance precipitable by sodium hydroxide, followed by eluting the resin with a 2–30% by weight aqueous solution of alkali metal hydroxide until the effluent is substantially free of phosphate, silicate, molybdate and organic color bodies, and then eluting the resin with an aqueous solution of mineral acid selected from the group consisting of 0.3–18 Normal sulfuric acid, 0.3–8 Normal nitric acid, 0.3–12 Normal hydrochloric acid and 0.3–12 Normal hydrofluoric acid until the effluent is substantially free of poisonous substances removable thereby.

16. A process for rejuvenating a poisoned strongly basic anion exchange resin which is quaternized (poly) alkyl vinyl pyridine; the resin being poisoned during repeated cycles in a process for the recovery of desired dissolved metal values from an aqueous hydrometallurgical liquor including an adsorption step wherein regenerated resin is contacted with the liquor to adsorb the said metal values, a regeneration step wherein the said adsorbed metal values are desorbed from the resin by stripping with a strip solution and a step wherein the resultant regenerated resin is recycled to the adsorption step; the poisoned resin containing values of at least one substance present in the solution selected from the group consisting of Bi, Cr, Fe, Hf, Mn, Mo, Pb, Sn, Ti, Zr, W, P and Si which is removed from the solution during the adsorption step and incompletely stripped from the resin during the regeneration step; comprising the steps of contacting the poisoned resin with an aqueous solution of mineral acid selected from the group consisting of about 0.3–18 Normal sulfuric acid, about 0.3–8 Normal nitric acid, about 0.3–12 Normal hydrochloric acid and about 0.3–12 Normal hydrofluoric acid, and contacting the resin with an aqueous solution containing about 2–30% by weight of an alkaline substance selected from the group consisting of alkali metal hydroxides, alkali metal carbonates, alkali metal bicarbonates, ammonium hydroxide, ammonium carbonate and ammonium bicarbonates, the resin contacting steps being performed without regard to sequence when the aqueous solution of mineral acid is at least 6 Normal and when it is less than 6 Normal the resin contacting step with the aqueous solution of alkaline substance preceding the resin contacting step with the aqueous solution of mineral acid.

17. A process for rejuvenating a strongly basic anion exchange resin which is a quaternized (poly) alkyl vinyl pyridine; the resin being poisoned during repeated cycles in a process for the recovery of uranium values from hydrometallurgical leach liquor containing uranyl sulfate complex including an adsorption step wherein regenerated resin is contacted with the leach liquor to adsorb uranium values, a regeneration step wherein uranium values are desorbed from the resin by stripping with a strip solution and a step wherein the resultant regenerated resin is recycled to the adsorption step; the poisoned resin containing values of at least one substance present in solution in the leach liquor selected from the group consisting of Bi, Cr, Fe, Hf, Mn, Mo, Pb, Sn, Ti, Zr, W, P and Si which is removed from the leach liquor during the adsorption step and incompletely stripped from the resin during the regeneration step thereby resulting in poisoning of the resin; comprising the steps of contacting the poisoned resin with an aqueous solution of mineral acid selected from the group consisting of about 0.3–18 Normal sulfuric acid, about 0.3–8 Normal nitric acid, about 0.3–12 Normal hydrochloric acid and about 0.3–12 Normal hydrofluoric acid, and contacting the resin with an aqueous solution containing about 2–30% by weight of an alkaline substance selected from the group consisting of alkali metal hydroxides, alkali metal carbonates, alkali metal bicarbonates, ammonium hydroxide, ammonium carbonate, and ammonium bicarbonate, the resin contacting steps being performed without regard to sequence when the aqueous solution of mineral acid is at least 6 Normal and when it is less than 6 Normal the resin contacting step with the aqueous solution of alkaline substance preceding the resin contacting step with the aqueous solution of mineral acid.

18. A process for rejuvenating a strongly basic anion exchange resin which is a quaternized (poly) alkyl vinyl pyridine; the resin being poisoned during repeated cycles in a process for the recovery of uranium values from hydrometallurgical leach liquor containing uranyl sulfate complex including an adsorption step wherein regenerated resin is contacted with the leach liquor to adsorb uranium values, a regeneration step wherein uranium values are desorbed from the resin by stripping with a strip solution and a step wherein the resultant regenerated resin is recycled to the adsorption step, the poisoned resin containing values of at least one substance present in solution in the leach liquor selected from the group consisting of Bi, Cr, Fe, Hf, Mn, Mo, Pb, Sn, Ti, Zr, W, P and Si which is removed from the leach liquor during the adsorption step and incompletely stripped from the resin during the regeneration step thereby resulting in poisoning of the resin; comprising the steps of contacting the poisoned resin with an aqueous solution containing about 2–30% by weight of an alkaline substance selected from the group consisting of alkali metal hydroxides, alkali metal carbonates, alkali metal bicarbonates, ammonium hydroxide, ammonium carbonate, and ammonium bicarbonate and then contacting the resin with an aqueous solution of mineral acid selected from the group consisting of about 0.3–18 Normal sulfuric acid, about 0.3–8 Normal nitric acid, about 0.3–12 Normal hydrochloric acid and about 0.3–12 Normal hydrofluoric acid.

19. A process for rejuvenating a strongly basic anion exchange resin which is a quaternized (poly) alkyl vinyl pyridine; the resin being poisoned during repeated cycles in a process for the recovery of uranium values from hydrometallurgical leach liquor containing uranyl sulfate complex including an adsorption step wherein regenerated resin is contacted with the leach liquor to adsorb uranium values, a regeneration step wherein uranium values are desorbed from the resin by stripping with a strip solution and a step wherein the resulting regenerated resin is recycled to the adsorption step; the poisoned resin containing values of at least one substance present in solution in the leach liquor selected from the class consisting of Bi, Cr, Fe, Hf, Mn, Mo, Pb, Sn, Ti, Zr, W, P and Si which is removed from the leach liquor during the adsorption step and incompletely stripped from the resin during the regeneration step thereby resulting in poisoning of the resin; comprising the steps of eluting the poisoned resin with an aqueous acidic solution of nitrate ion, followed by eluting the resin with a 5–10% by weight aqueous solution of alkaline carbonate until the effluent is substantially free of poisonous substances precipitable by sodium hydroxide, followed by eluting the resin with a 2–30% by weight aqueous solution of alkali metal hydroxide until the effluent is substantially free of phosphate, silicate, molybdate and organic color bodies, and then eluting the resin with an aqueous solution of mineral acid selected from the group consisting of 0.3–18 Normal sulfuric acid, 0.3–8 Normal nitric acid, 0.3–12 Normal hydrochloric acid and 0.3–12 Normal hydrofluoric acid until the effluent is substantially free of poisonous substances removable thereby.

References Cited by the Examiner

UNITED STATES PATENTS

| | | | |
|---|---|---|---|
| 2,650,177 | 8/1953 | Meijer | 260—2.1 |
| 2,669,713 | 2/1954 | Osmun | 260—2.1 |

OTHER REFERENCES

Nachod: "Ion Exchange," pp. 89–91, 342, Academic Press, (1949).

WILLIAM H. SHORT, *Primary Examiner.*

H. N. BURSTEIN, LOUISE P. QUAST, JOSEPH R. LIBERMAN, CARL D. QUAFORTH, *Examiners.*